H. P. BECKER.

Assignor of one-half interest to N. UNDERWOOD.

MACHINE FOR SCOURING AND POLISHING GRAIN.

No. 7,486. Reissued Feb. 6, 1877.

Witnesses.

Ind. G. Dieterich

J. C. Wildman

Inventor.

Henry P. Becker.

By DeWitt C. Allen

Atty.

N. PETERS, PHOTO-LITHOGRAPHER, WASHINGTON, D. C.

UNITED STATES PATENT OFFICE.

HENRY P. BECKER, OF DIXON, ILLINOIS, ASSIGNOR OF ONE-HALF INTEREST TO NATHAN UNDERWOOD, OF SAME PLACE.

IMPROVEMENT IN MACHINES FOR SCOURING AND POLISHING GRAIN.

Specification forming part of Letters Patent No. 151,556, dated June 2, 1874; reissue No. 7,486, dated February 6, 1877; application filed October 19, 1876.

*To all whom it may concern:*

Be it known that I, HENRY P. BECKER, of Dixon, in the county of Lee and State of Illinois, have invented certain new and useful Improvements in Machines for Scouring and Polishing Grain; and I do hereby declare the following to be a full, clear, and exact description of the same, reference being had to the accompanying drawings, making a part of this specification, in which—

Figure 1:
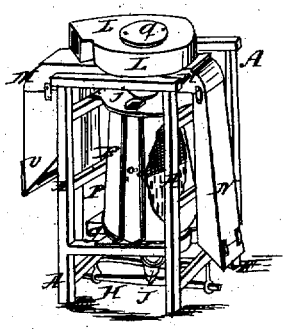
Figure 2:
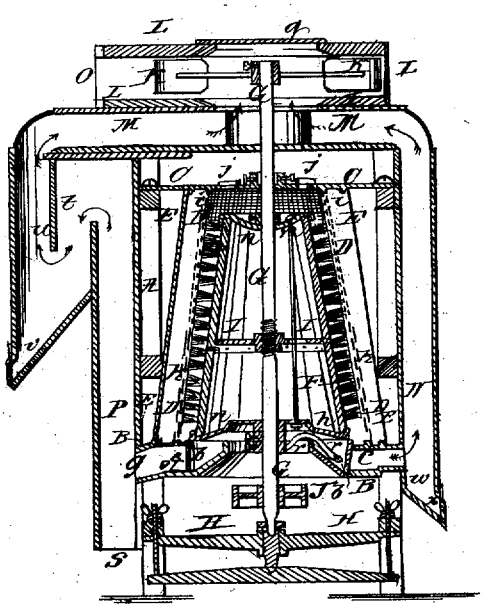
Figure 3:
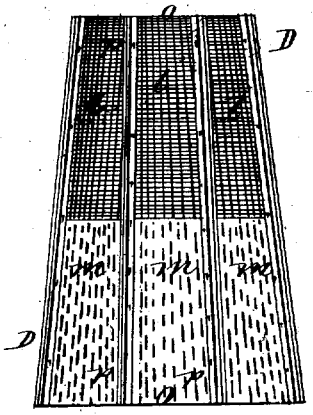
Figure 4:
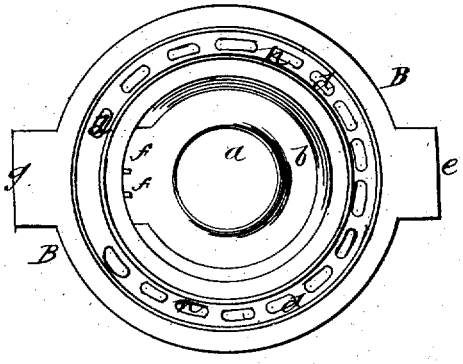
Figure 5:
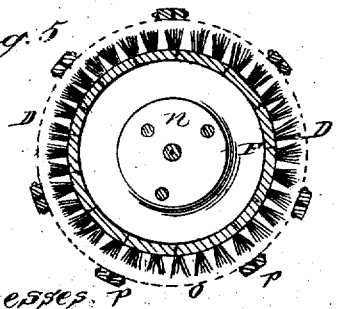

Figure 1 represents in perspective a view of the machine, with a portion of the outer case shown as broken away to expose the screen within it. Fig. 2 represents, on an enlarged scale, a vertical section through the machine. Fig. 3 represents the conical screen separated from the machine. Fig. 4 represents a top plan view of the bottom plate; and Fig. 5 represents a horizontal section through the conical brush, and screen around it.

My invention relates to a machine in which grain, in passing through, is scoured and polished, and separated from the impurities that are rubbed from it; and the invention consists in the construction and arrangement of the several mechanisms, as will be hereinafter particularly specified, by which its objects and purposes are made available.

The frame which supports the operative parts of the machine is shown at A, and upon this frame is placed the base-plate B, separately shown in Fig. 4. This base-plate is cast with an opening, *a*, through its center, beyond which there is a trough, *b*, and outside of the trough an annular passage, *c*, with which a series of air-openings, *d*, communicate, and an exit-passage, *e*. The annular passage *c* does not extend entirely around the base-plate, it being interrupted at *f* by passages leading from the trough *b* through to an exit-passage or discharge-opening, *g*, whence the grain passes from the scourer and polisher into the air-blast; and, finally, this base-plate is furnished with a concentric flange, *h*, for a purpose to be hereinafter explained. The top plate C is smaller in diameter than the bottom one, and it is also furnished with a concentric flange, *i*, which acts in connection with the flange *h* on the bottom plate, for holding the conical screen D; and in this top plate C are the openings *j*, into which the grain is fed to the machine. The outer shell or case E is of conical form, and held between the top and base plates in the usual way. The screen D is made in sections, and it is held by the concentric flanges *h* and *i* on the top and bottom plates, and so as to leave a space, *k*, between itself and the outer case. This screen is also conical, and its upper portion *l* is made of woven wire for forming a scouring-surface, and its under portion *m* is made of perforated metal (sheets or plates) for forming a polishing-surface. Inside of the conical screen D is arranged the conical brush F, which is made in sections, by preference; and this brush is hollow and held to the heads *n*, which have bearings in them, by which they and the brush are secured to, so as to revolve with, the shaft G. The bristles of the brush run near the interior surface of the screen D, and are subject to wear, and must, of necessity, to be efficient, be capable of being brought and kept in contact with the screen. To this end, in addition to the ordinary adjustment through, or by means of, the bridge-tree H, which is limited, I have contrived as follows: At or near the center of the brush there is a disk or ring, I, to which the brush staves or sections are united. In the center or hub of this disk or ring I there is cut a screw-thread, and upon the shaft G there is also cut a screw that will run into that on or in the hub of the disk or ring, so that by first backing or loosening the set-screws that hold the brush to the shaft, and then turning the shaft G, the brush can be moved up until the bristles are again in contact with the screen.

I am aware that a cylindrical brush has been used in connection with a cylindrical screen; but this arrangement, in addition to that of not admitting of the brush, as herein stated, is objectionable, as the grain drops through too fast for a thorough cleaning; whereas, by a conical brush the grain is held against the screening and polishing surfaces for a longer period, and cannot drop to any extent between the screen and brush, as the latter catches it and moves it against the screen.

By making the screen D conical, and of two different kinds or qualities of rubbing-surface—namely, woven wire above, and punched plate metal below—the scouring by the upper surface is immediately followed by the polishing of the grain against the smoother sheet or plate metal; and with this additional advantage, too, that the diameter of the brush is greater opposite the sheet or plate part of the screen, and the polishing requires a quicker motion of the brush than the scouring does. Both conditions are found in making the brush conical and the screen of the different material hereinbefore mentioned, so as to scour and polish by one passage through of the grain.

The shaft G may be revolved by a belt passing around the pulley J, and upon the top of the shaft is arranged the fan K, which revolves in a fan-case, L. The blades, and sometimes the arms of the fan, are curved, so that they must run in a particular direction; and it often happens, when the machine is to be connected with the driving-power, that the latter turns in the wrong direction for the vanes of the fan. To avoid the perplexity of this difficulty, I make my fan-case K with its heads and eyes exactly alike, and separate or separable from the air-trunk M, so that, if the driving-power runs in the wrong direction for the curvature of the fan-blades, the fan and case are disconnected, turned upside down, and refastened to the shaft, and both will then correspond. The upper eye is closed by a plate, *q*, which is applicable to either eye when it is uppermost.

To a collar upon the shaft G, below the base of the brush F, there are attached one, two, or more stirrers or movers, *r*, which sweep around through the trough *b*, where the treated grain falls, and moves the grain around to the outlet, *f*, whence it passes into the fan-blast, to divest it of all impurities. The dust and hulls scoured and rubbed off the grains by the brush rolling them against the screen pass through said screen, and are drawn down through the space *k* and through the openings *d* into the annular chamber *c* by the exhaust-blast created by the fan, and, passing out of the exit at *e*, go directly into the wind-trunk N, and thence up and through M into the fan-case, and out at O. The grain which passes out at *g* drops into a blast which passes up through the trunk P, the light impurities going up with the blast to the fan-case, while the cleaned wheat drops out at *s*. The ascending current through the passage P is deflected at *t*, and passes down under a board, *u*, which so slackens its force as to cause it to drop anything heavier than the light impurities into the eddy-chamber *v*, whence it can be taken out through an opening covered by a valve or slide. So, too, of the blast through the trunk N: any grain that may have passed out through *e*, or anything heavier than the light impurities, will drop into the eddy-chamber *w*, whence it can be removed through the opening *x*, which is commanded by a door or slide. The fine impurities are all drawn into the fan-case by the exhaust-blast, and thence out of the building, if necessary.

I am aware that a conical brush, in which the bristles are secured in a solid block of wood, said block of wood having a vertical hollow-screw shaft extending entirely through it, within which works a screw-shaft, for adjusting the brush, is old, and such I do not desire to claim as my invention; but

Having thus fully described my invention, what I claim therein as new, and desire to secure by Letters Patent, in a grain scouring and polishing machine, is—

1. An exterior screen, the upper part of which is made of woven wire, and the lower part of perforated sheet or plate metal, substantially as and for the purpose specified.

2. In combination with a conical brush, an exterior conical screen, the upper part of which is made of woven wire, and the lower part of perforated sheet or plate metal, substantially as and for the purpose described.

3. The combination, with the solid brush F, of the ring or disk I, to which the brush-staves are secured, shaft G, having a screw thereon, working within the screw-hub of said disk, and set-screws that hold the brush to the shaft, and against casual motion on the screw thereon, the several parts constructed and arranged to operate in the manner herein shown and described.

4. In combination with the base-plate B, the trough *b*, and its outlet, and the annular passage *c*, and its inlets and outlets, being all in one piece, as and for the purpose described.

5. In combination with the wind-trunk M and shaft G, the reversible fan-case, provided with two eyes, the fan, and cap or cover *q*, as and for the purpose described.

HENRY P. BECKER.

Witnesses:

DE WITT C. ALLEN,

N. L. ALLEN.